US011205110B2

(12) United States Patent
Willson et al.

(10) Patent No.: US 11,205,110 B2
(45) Date of Patent: Dec. 21, 2021

(54) DEVICE/SERVER DEPLOYMENT OF NEURAL NETWORK DATA ENTRY SYSTEM (71) Applicant: Microsoft Technology Licensing, LLC, Redmond, WA (US)

(72) Inventors: Matthew James Willson, London (GB); Marco Fiscato, London (GB); Juha Iso-Sipilä, London (GB); Douglas Alexander Harper Orr, Brentwood (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 795 days.

(21) Appl. No.: 15/332,907

(22) Filed: Oct. 24, 2016

(65) Prior Publication Data
US 2018/0114112 A1 Apr. 26, 2018

(51) Int. Cl.
*G06N 3/04* (2006.01)
*G06N 3/02* (2006.01)
*G06F 40/274* (2020.01)

(52) U.S. Cl.
CPC ......... *G06N 3/0445* (2013.01); *G06F 40/274* (2020.01); *G06N 3/02* (2013.01); *G06N 3/0454* (2013.01)

(58) Field of Classification Search
CPC ...... G06N 3/0445; G06N 3/02; G06N 3/0454; G06F 17/276
See application file for complete search history.

(56) References Cited

U.S. PATENT DOCUMENTS 5,822,730 A   10/1998   Roth et al.
5,905,773 A    5/1999   Wong
(Continued)

FOREIGN PATENT DOCUMENTS

CN   104036010 A   9/2014
CN   104504442 A   4/2015

OTHER PUBLICATIONS

Leong, et al. "On Adaptive Caching in Mobile Databases", in ACM Symposium on Applied Computing, Apr. 1997, pp. 302-309 (Year: 1997).*

(Continued)

*Primary Examiner* — Kakali Chaki
*Assistant Examiner* — Vasyl Dykyy
(74) *Attorney, Agent, or Firm* — Schwegman Lundberg & Woessner, P.A.

(57) ABSTRACT

An electronic device is described which has at least one input interface to receive at least one item of a sequence of items. The electronic device is able to communicate with a server, the server storing a neural network and a process which generates item embeddings of the neural network. The electronic device has a memory storing a copy of the neural network and a plurality of item embeddings of the neural network. In the case when there is unavailability at the electronic device of a corresponding item embedding corresponding to the received at least one item, the electronic device triggers transfer of the corresponding item embedding from the server to the electronic device. A processor at the electronic device predicts at least one candidate next item in the sequence by processing the corresponding item embedding with the copy of the neural network and the plurality of item embeddings.

20 Claims, 8 Drawing Sheets (56) References Cited

U.S. PATENT DOCUMENTS

| | | | |
|---|---|---|---|
| 6,195,641 | B1 | 2/2001 | Loring et al. |
| 6,751,595 | B2 | 6/2004 | Busayapongchai et al. |
| 6,999,931 | B2 | 2/2006 | Zhou |
| 7,624,015 | B1 | 11/2009 | Rahim et al. |
| 7,716,058 | B2 | 5/2010 | Roth et al. |
| 8,589,163 | B2 | 11/2013 | Ljolje et al. |
| 2007/0282768 | A1 | 12/2007 | Chang et al. |
| 2009/0063557 | A1 | 3/2009 | Macpherson |
| 2009/0150593 | A1* | 6/2009 | Hamilton ............... G06F 3/061 711/101 |
| 2015/0066496 | A1 | 3/2015 | Deoras et al. |
| 2015/0095017 | A1* | 4/2015 | Mnih ................ G06N 3/0454 704/9 |
| 2015/0100537 | A1 | 4/2015 | Grieves et al. |
| 2015/0213365 | A1* | 7/2015 | Ideses .................. H04L 63/14 706/12 |
| 2016/0148078 | A1* | 5/2016 | Shen ...................... G06K 9/66 382/158 |
| 2016/0299685 | A1* | 10/2016 | Zhai ..................... G06F 3/0219 |
| 2016/0328644 | A1* | 11/2016 | Lin ....................... G06N 3/084 |
| 2016/0342720 | A1 | 11/2016 | Veneris et al. |
| 2017/0091169 | A1 | 3/2017 | Bellegarda et al. |
| 2017/0372696 | A1* | 12/2017 | Lee ...................... G10L 15/02 |
| 2018/0204120 | A1 | 7/2018 | Rei et al. |
| 2021/0097389 | A1 | 4/2021 | Kiranyaz |

OTHER PUBLICATIONS

"Office Action Issued in European Patent Application No. 17797481. 3", dated Jun. 3, 2019, 3 Pages.
Liu, et al., "Efficient Lattice Rescoring Using Recurrent Neural Network Language Models", In Proceedings of the IEEE International Conference on Acoustics, Speech and Signal Processing (ICASSP), May 4, 2014, pp. 4908-4912.
"International Preliminary Report on Patentability Issued in PCT Patent Application No. PCT/GB2016/052022", dated Sep. 20, 2017, 7 Pages.
"International Search Report & Written Opinion Issued in PCT Patent Application No. PCT/GB2016/052022", dated Sep. 30, 2016, 13 Pages.
"International Search Report and Written Opinion Issued in PCT Application No. PCT/US2017/056702", dated Feb. 6, 2018, 16 Pages.
"Introducing the World's First Neural Network Keyboard", Retrieved from <<http://web.archive.org/web/20160404191822/https://blog. swiftkey.com/neural-networks-a-meaningful-leap-for-mobile-typing>>, Oct. 8, 2015, 8 Pages.
Goldberg, Yoav, "A Primer on Neural Network Models for Natural Language Processing", In Journal of Artificial Intelligence Research, vol. 57, Oct. 5, 2015, 76 Pages.
Graves, Alex, "Generating Sequences with Recurrent Neural Networks", Retrieved from <<https://arxiv.org/pdf/1308.0850v1. pdf>>, Aug. 4, 2013, 43 Pages.
Leong, et al., "On Adaptive Caching in Mobile Databases", In ACM Symposium on Applied Computing, Apr. 1997, pp. 302-309.
"How Do Neural Networks Make Better Word Predictions", Retrieved from <<http://web.archive.org/web/20160411012432im_/https:// d3vvnhml5anv1n.cloudfront.net/content/uploads/2015/10/neural-net-infographic.jpg>>, Apr. 4, 2016, 4 Pages.
Pennington, et al., "GloVe: Global Vectors for Word Representation", Retrieved from <<http://web.archive.org/web/20160925004021/ https://nlp.stanford.edu/projects/glove/>>, Sep. 25, 2016, 2 Pages.
Plieninger, Andreas, "Deep Learning Neural Networks on Mobile Platforms", Retrieved from <<https://www.nst.ei.tum.de/fileadmin/ w00bqs/www/publications/as/2015WS-HS-Deep_leanring_mobile_ platforms.pdf>>, Jan. 18, 2016, 31 Pages.
Mi, et al., "Vocabulary Manipulation for Neural Machine Translation", In Proceedings of 54th Annual Meeting of the Association for Computational Linguistics, Aug. 7, 2016, pp. 124-129.
Stolcke, et al., "SRILM at Sixteen: Update and Outlook", In Proceedings of IEEE Automatic Speech Recognition and Understanding Workshop, Dec. 11, 2011, 5 pages.
Chen, et al., "Strategies for Training Large Vocabulary Neural Language Models", In Proceedings of 54th Annual Meeting of the Association for Computational Linguistics, Aug. 7, 2016, pp. 1975-1985.
Schwenk, Holger, "Continuous space language models", In Journal of Computer Speech and Language, vol. 21, Issue 3, Oct. 9, 2006, pp. 492-518.
Bengio, Yoshua, "Neural net language models", In Journal of Scholarpedia, vol. 3, Issue 1, 2008, 7 pages.
Ganguly, et al., "A Word Embedding based Generalized Language Model for Information Retrieval", In Proceedings of 38th International ACM SIGIR Conference on Research and Development in Information Retrieval, Aug. 9, 2015, pp. 795-798.
"Office Action Issued in European Patent Application No. 17797481. 3", dated Sep. 9, 2020, 10 Pages.
Coninck, et al., "DIANNE: Distributed Artificial Neural Networks for the Internet of Things", In Proceedings of the 2nd Workshop on Middleware for Context-Aware Applications in the IoT, Dec. 7, 2015, pp. 19-24.
Makarenkov, et al., "Language Models with GloVe Word Embeddings", In Journal of Computing Research Repository, Oct. 12, 2016, 7 Pages.
"Office Action Issued in European Patent Application No. 16738856. 0", dated Jun. 5, 2020, 5 Pages.
"Second Office Action issued in Chinese Patent Application No. 201680040427.1", dated Jun. 9, 2021, 14 Pages.
"First Office Action and Search Report Issued in Chinese Patent Application No. 201680040427.1", (w/ Concise Statement of Relevance), dated Nov. 26, 2020, 12 Pages.
"Office Action Issued in European Patent Application No. 16738856. 0", Mailed Date: Sep. 29'. 2021,6 Pages. Kms# 346375-EP-EPT).
Karsoliya, et al., "Approximating No. of Hidden Layer Neurons in Multiple Hidden Layer BPNN Architecture", in International Journal of Engineering Trends and Technology. Volume 3, Issue 6, Dec. 3, 2012, pp. 714-717.
"Non Final Office Action issued in US Patent Application No. 15.742,486", Mailed Date: Oct. 6, 2021,40 Pages. Kms# 346375-US-PCT).
Haykin, et al., "Neural Networks: A Comprehensive Foundation, Second Edition", Retrieved From: https://cdn. pretertiuman.net/ texts/science_and_technology/artificial_intelligeri ce/Neural% 20Networks7o20-%20A%20Comprehensive%20Foundation%20-% 20Simon%20Haykin.pdf, 1999, 823 Pages. V.

* cited by examiner

DEVICE/SERVER DEPLOYMENT OF NEURAL NETWORK DATA ENTRY SYSTEM

BACKGROUND

Data entry such as entering text characters, emoji and other data into electronic devices which have a small form factor is time consuming, cumbersome and error prone for end users. One approach to facilitating data entry is to provide predictive keyboards such as soft keyboards which are displayed on a touchscreen of the electronic device and used by the end user to type in characters, emoji, symbols and other data. Predictive keyboards typically present one or more candidate predicted words or phrases as options for the user to select and so enter into the electronic device.

The technology used to give the functionality of such predictive keyboards includes neural network technology in some cases. For example, where neural networks are used to predict candidate words that a user is likely to want to input. However, neural networks take up significant resources (such as memory and processing resources) and this makes it difficult to achieve good accuracy of performance where the neural network is located on a resource constrained device such as a smart phone, tablet computer, wearable computer or other resource constrained device.

A neural network is a collection of nodes interconnected by edges and where there are weights associated with the nodes and/or edges. Various functions or nonlinearities are applied at individual ones of the nodes. During a training phase the weights are updated according to update rules in the light of training examples. Once the neural network has been trained, it may be used to compute predictions from examples which have not previously been seen by the neural network during training, through generalization.

The embodiments described below are not limited to implementations which solve any or all of the disadvantages of known data entry systems using neural network technology.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

An electronic device is described which has at least one input interface to receive at least one item of a sequence of items. The electronic device is able to communicate with a server over a communications network, the server storing a neural network and a process which generates item embeddings of the neural network. The electronic device has a memory storing a copy of at least part of the neural network and a plurality of item embeddings of the neural network. In the case when there is unavailability at the electronic device of a corresponding item embedding corresponding to the received at least one item, the electronic device triggers transfer of the corresponding item embedding from the server to the electronic device. A processor at the electronic device predicts at least one candidate next item in the sequence by processing the corresponding item embedding, and item embeddings for one or more other preceding items if available, with the copy of the neural network and using item embeddings for a plurality of candidate next items retrieved from the memory. The processor is configured to make available the candidate next item for input to the electronic device.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

Inputting data such as text, images, or other data to electronic devices is difficult especially where those electronic devices have a small form factor. Neural network technology may be used to predict items in sequences of items of data and offer those as candidates for input and this reduces burden on the end user. However, neural networks take up significant memory and processing resources which presents a difficulty where electronic devices with limited resources are involved. Various examples described herein demonstrate how quality of performance of neural network predictive technology can be successfully traded against resource requirements by using client-server deployments. In various examples this is achieved whilst ameliorating the effects introduced by network latency.

Although the present examples are described and illustrated herein as being implemented in a predictive keyboard system, the system described is provided as an example and not a limitation. As those skilled in the art will appreciate, the present examples are suitable for application in a variety of different types of data entry systems including voice data entry, text data entry, image data entry and others.

Figure 1:
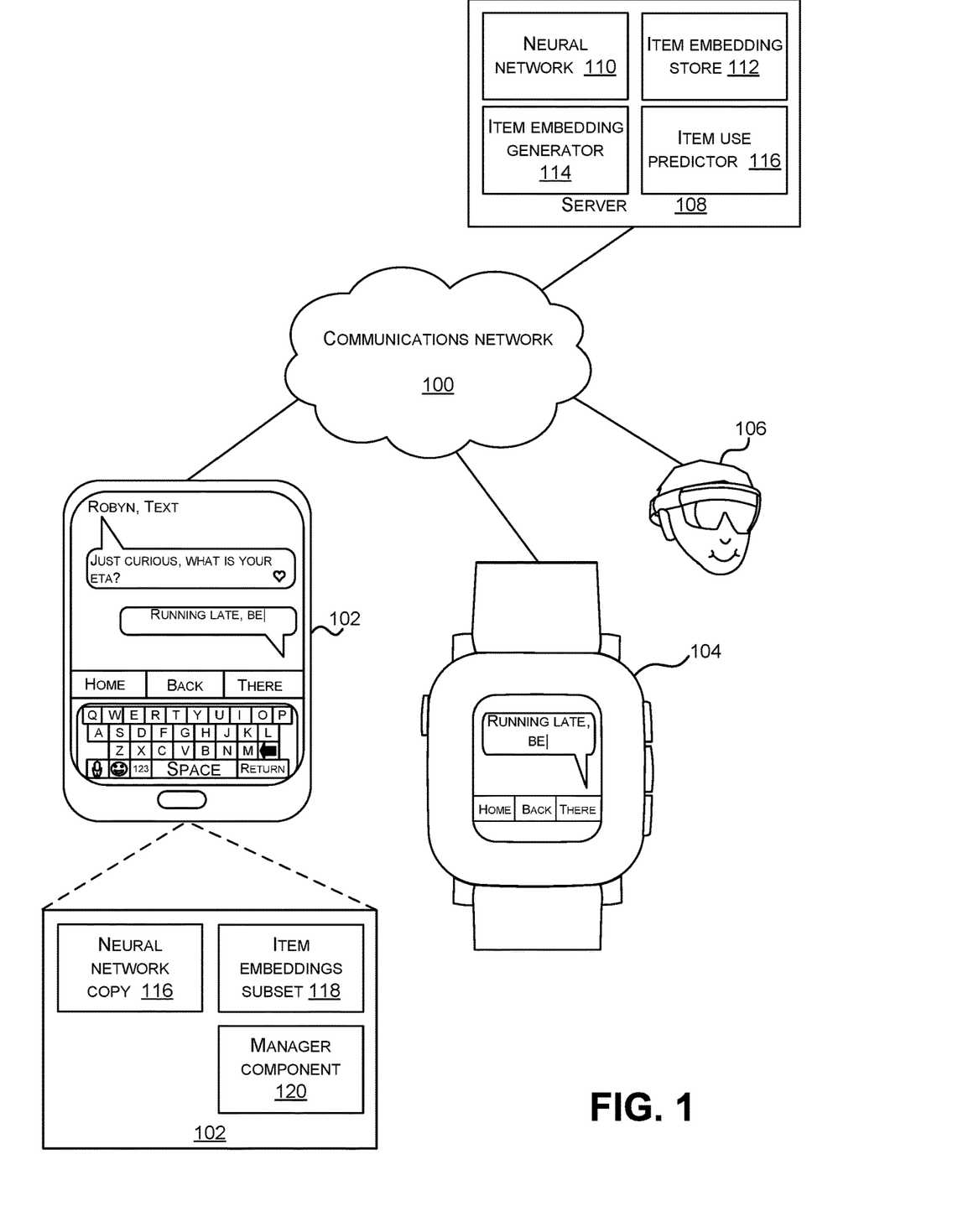
FIG. 1 is a schematic diagram of a plurality of electronic devices which have a neural network as part of a predictive data entry system, and where the electronic devices are able to communicate with a server that also has the neural network.

FIG. 1 is a schematic diagram of a plurality of electronic devices 102, 104, 106 in communication with a server 108 over a communications network 100 such as the internet or any other communications network. The server stores a neural network 110 for predicting items in a sequence of items such as words, phrases, morphemes, characters or other units of language. The items can be images in some examples, such as emoji, emoticons, stickers or other images which are used as part of text. The neural network 110 has been trained in advance, for example, during a manufacturing stage or in an offline stage. The training takes place at the server 108 or any other entity and uses training data as explained in more detail later in this document.

After training, at least part of the neural network 110 is installed at the individual electronic devices 102, 104, 106. An individual electronic device 102, 104, 106 is then able to use its local copy of at least part of the neural network to make predictions itself rather than requesting those predictions from the neural network at the server. The neural network 110 comprises layers of nodes interconnected by edges and with weights associated with the nodes and/or edges. The neural network 110 has an item embedding generator 114 and/or an item embedding store 112 and these are shown in FIG. 1 as separate boxes in order to aid understanding of the present technology, even though these may be considered as part of the neural network 110 itself. Thus the neural network can be considered as comprising a core together with an item embedding generator 114 and/or item embedding store. The core of the neural network 110 is able to predict next items in a sequence of items given an item embedding of at least one item in the sequence and also given a plurality of item embeddings of candidate next items. The local copy of at least part of the neural network 110 comprises a copy of the core of the neural network 110.

For example, a copy of the neural network 116 is stored at smart phone 102 during manufacturing or by download from the server 108 as part of download of a predictive keyboard application from the server. It is also possible for the copy of the neural network 116 to be downloaded separately after download of a predictive keyboard application from the server. A copy of the neural network is stored at a head worn augmented reality computing device 106 in some examples and is used to predict candidate words in a sequence of speech input of the user. A copy of the neural network is stored at a smart watch in some examples and is used to predict candidate words in a sequence of text input at the smart watch. The examples of the smart phone 102, smart watch 104 and head worn computing device 106 are not intended to limit the scope of the technology but are provided to illustrate how the technology is used.

In the examples described herein the neural network 110 at the server, and the copies of the neural network 116 at the electronic devices 102, 104, 106 use item embeddings. Note that the copies of at least part of the neural network 116 at the electronic devices may differ from one another in some examples. For example, if one of the electronic devices has more processing power and memory than others of the electronic devices, it may hold a larger part of the neural network 110 copied from the server than the other electronic devices.

An item embedding is a plurality of learnt weights representing an item of the sequence of items in a form that can be processed by units of a neural network. An item embedding may be a real valued vector in some cases. In some examples, an item embedding also comprises a scalar bias value which is stored as part of the real valued vector or which is stored separately. The learnt weights of the item embedding are numerical values. The item embeddings are used in at least two different stages of the data entry process and these may be referred to as a neural network input stage and a neural network output stage. At the neural network input stage, where a user inputs an item such as a word, phrase, morpheme, emoji, character or other item into the electronic device the neural network copy at the device is used to predict candidate next items in a sequence of the items. In order to input the item into the neural network it is mapped to an item embedding which is then input to the neural network. Where the user inputs a sequence of items such as the words "I", "am", "a", "beautiful" then each of these individual words is mapped to a corresponding item embedding and input to the neural network in order to predict candidate next words such as "person".

At the neural network output stage, an output layer of the neural network produces numerical values which are activation levels of units in the output layer of the network. These numerical values form a predicted item embedding. In order to convert the predicted item embedding into scores for individual candidate items (such as candidate words, phrases, morphemes, emoji or other items) a measure of similarity is computed between the predicted item embedding and individual ones of a plurality of item embeddings available at the electronic device. In some examples a dot product is computed as the measure of similarity but this is not essential as other measures of similarity may be used. The similarity measures give a plurality of scores, one for each of the item embeddings, which when normalized express the likelihood that the next item in the sequence is each of the items corresponding to the item embeddings. Where an item embedding has an associated bias value as mentioned above, the bias value is aggregated with the score, for example by addition, multiplication or other forms of aggregation. In this way the score becomes biased in a manner taking into account the bias value. The bias values are manually configured, set to the log probability of the item under a unigram model (which may be computed from a training set of items), or learnt through backpropagation in a similar way to the item embeddings.

In order that a copy of the neural network 116 at the electronic device 102, 104, 106 is able to operate to generate predictions, it uses item embeddings for the neural network input and output stages mentioned above. The electronic device 102 has a stored subset of item embeddings 118 to facilitate the local operation of the neural network copy 116. However the item embeddings take up memory at the electronic device and this memory is limited.

In various embodiments the electronic device has a subset of the item embeddings of the neural network 110 which are available at the server 108 where a subset means some but not all of the item embeddings of the neural network 110 which are available at the server. By having a subset of the item embeddings 118 at the electronic device memory is saved as compared with having a larger set of item embeddings at the electronic device. Also, processing resources are saved since there are fewer item embeddings to generate scores for at the neural network output stage. The processing resources used at the output stage increases linearly as the number of item embeddings increases and so there is significant impact on processing resources at the output stage.

Quality or accuracy of the predictions made at the electronic devices using the local copy of the neural network is another factor to consider. Suppose a user enters an item at the electronic device 102, 104, 106 and there is no item embedding available for that item at the electronic device. It is possible to use a default or dummy item embedding for the item (referred to as an out of vocabulary item) and proceed using that default or dummy item embedding to generate a prediction. This is useful where the item is part of context, such as where the user enters "I", "am", "a", "beautiful" and there are item embeddings available locally for "I", "am" and "a" but not for "beautiful". By using a default/dummy item embedding for "beautiful" the neural network gains information about the context having four items rather than three (if "beautiful" were simply ignored). However, the quality of the prediction is reduced as compared with the case when the item embedding for "beautiful" is available.

One problem is difficulty in selecting an appropriate subset of item embeddings 118 for storing at an electronic device 102 in a fast and cost effective manner. In some examples, full personalization is carried out at the server whereby item use data is obtained for individual users (appropriate consent having been given) and used to create bespoke subsets of item embeddings on a per-user basis or on the basis of membership of specified groups. However, this is time consuming and expensive to achieve. Another option is to use a default subset of item embeddings for any individual user of a given category. For example, a default subset of item embeddings may be the ten thousand most frequent words in the English language although this is one example and others are possible. In the case that a default subset of item embeddings is stored at the individual electronic devices 102, 104, 106, there is a problem when a user enters an item which is not in the default subset, or when the next item in the sequence being entered by the user is not in the default subset. In this case the quality of prediction falls because context cannot be taken into account fully (in cases where more than one item is entered by the user) and because the neural network is unable to predict the correct candidate next item as that candidate next item does not exist in its available item embeddings.

To facilitate improved quality in cases where a subset of item embeddings is used at the electronic device, various examples described herein enable the electronic device to trigger transfer of item embeddings from the server to the electronic device. This transfer takes time due to network latency and to accommodate this various measures may be taken. For example, batching is used in some cases to batch item embedding requests sent from an electronic device to the server, and/or to batch item embeddings sent from the server to an electronic device. For example, predictive processes are used at the server and/or electronic device to anticipate item embeddings which are likely to be used in future to facilitate transfer of those item embeddings in advance of their use.

In some examples the server 108 has an item embedding generator 114 which is a trained predictive model that receives an item and predicts an item embedding. The item embedding generator is not essential because in some cases the server has a store of item embeddings created during training of the neural network 110. In various examples, the individual electronic devices 102, 104, 106 do not have item embedding generators 114 in order to save memory and processing resources at the electronic devices.

The server has an item use predictor 116 in some examples although this is not essential. The item use predictor 116 obtains data about use of items and is able to predict items likely to be needed at individual ones of the electronic devices. For example, the item use predictor may be a trained multi label classifier, for example, implemented by a neural network (or another algorithm that is known in the art) and trained on item usage data extracted from a training set of item logs.

In some examples the electronic device 102, 104, 106 has a manager component 120 configured to control triggering of transfer of item embeddings from the server.

Figure 7:
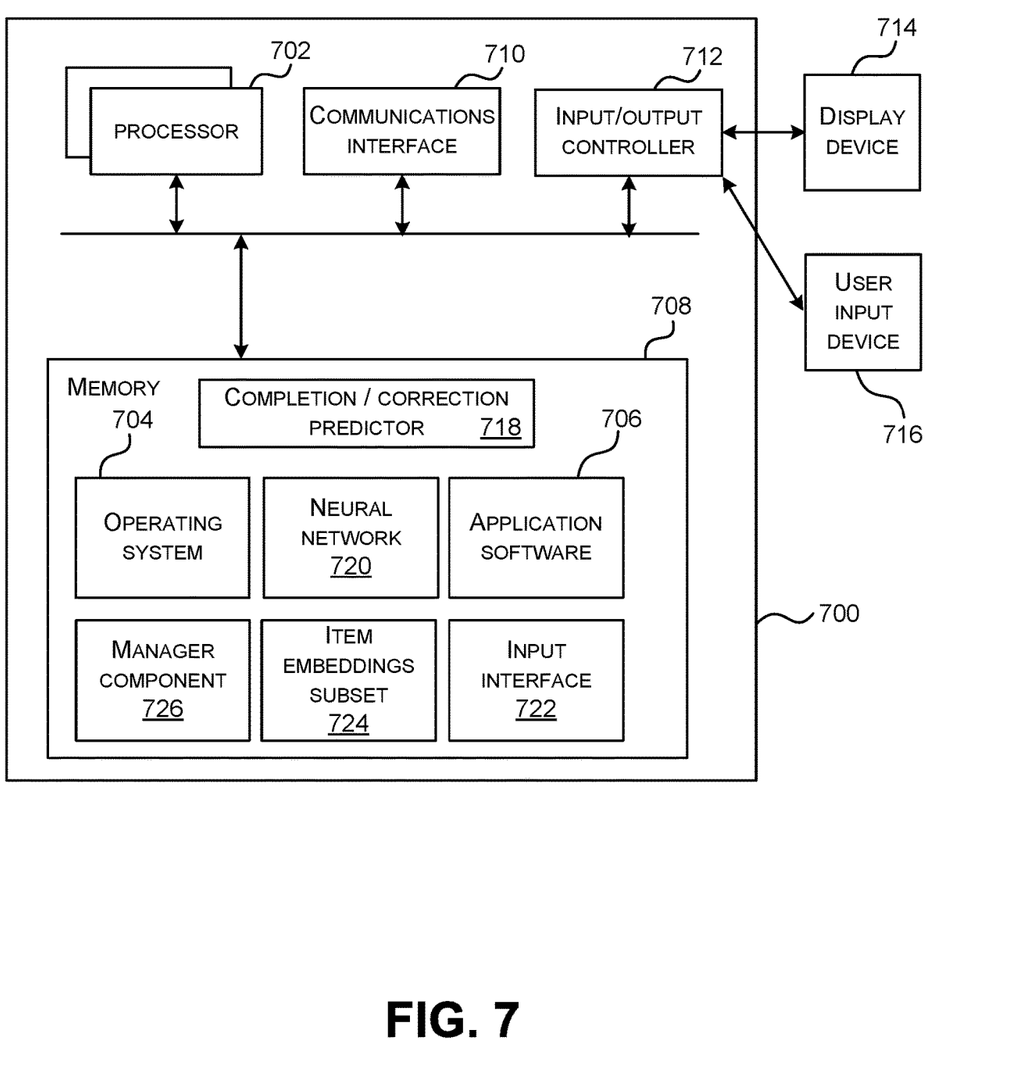
FIG. 7 is a schematic diagram of a computing device such as the electronic device of any of FIGS. 1 and 2.
Figure 8:
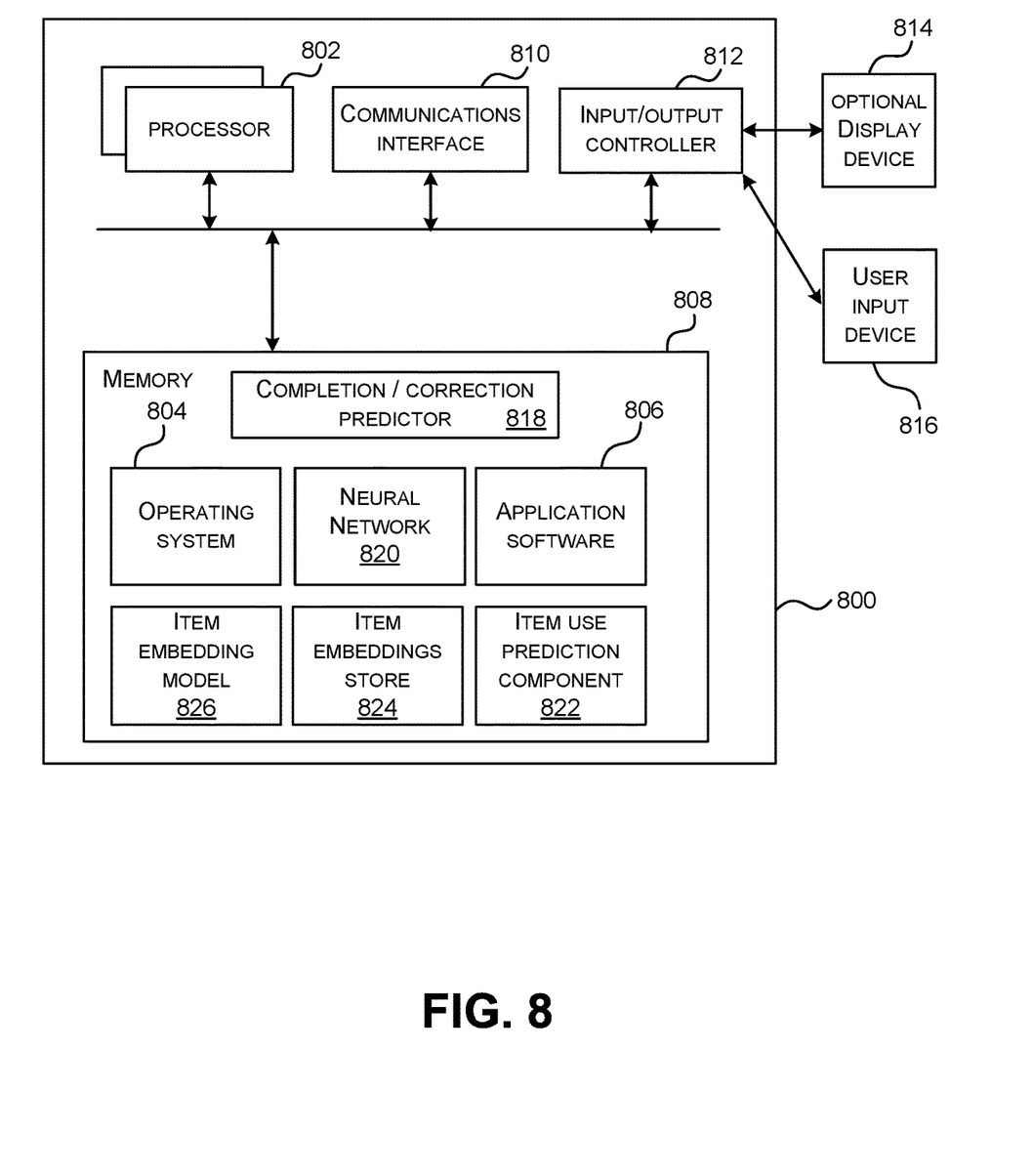
FIG. 8 is a schematic diagram of a server such as the server of FIG. 1; Like reference numerals are used to designate like parts in the accompanying drawings.

FIG. 1 shows some but not all of the components of the server and the electronic device 102 for clarity; FIGS. 7 and 8 give more detail about the server and the electronic device and are explained later in this document.

Alternatively, or in addition, the functionality of the server and/or the electronic device described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2:
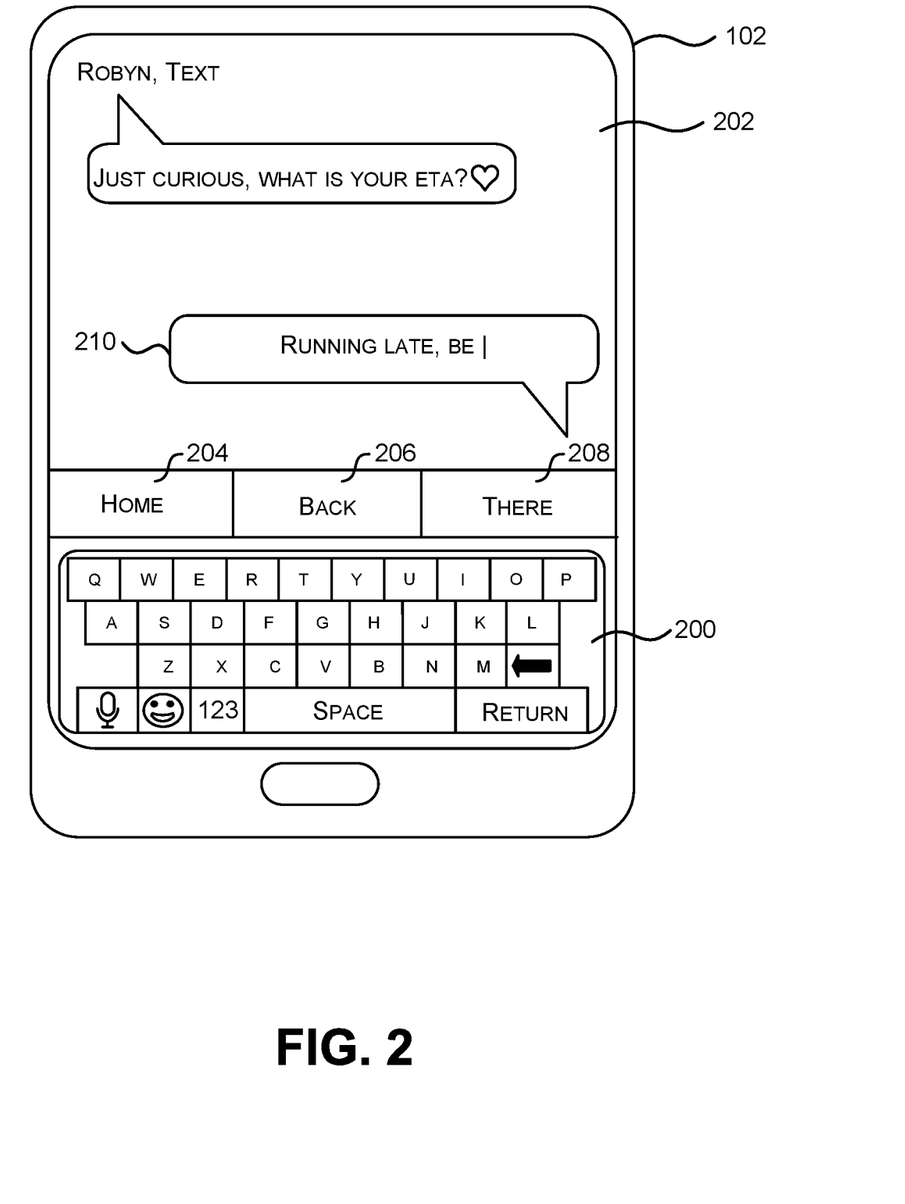
FIG. 2 is a schematic diagram of an electronic device with a predictive keyboard using neural network technology.

FIG. 2 is a schematic diagram of electronic device 102 in the case this device is a smart phone having a predictive keyboard that uses neural network technology. The smart phone has a display screen 202 such as a touch screen which displays a keyboard 200 for entering text to the electronic device 102. The keyboard 200 includes three candidate prediction regions 204, 206, 208 which display candidate predictions computed by the neural network technology. In this example, the user has received a short message service (SMS) message from Robyn which says "Just curious, what is your ETA?". The user is in the process of entering a reply SMS message in entry field 210 and so far has input the words "Running late, be" and the predictive keyboard has computed three candidate predicted next words which are "home", "back" and "there" and these are displayed on the keyboard 200. The user is able to select one of the candidate predicted next words rather than entering the separate characters to form that word. This saves burden for the end user with regard to data entry. However, the quality of the predictions is important because if the candidate word is not the actual word the user intends to enter then the user has to enter the individual characters of the intended word. The quality of the predictions depends on various factors such as the amount and variety of training data used during training, the type of training used, the architecture of the neural network, the ability of the neural network to generalize to examples it has not seen during training, and other factors such as the available item embeddings (in the case that item embeddings are used as described below with reference to FIG. 3). The candidate predictions are updated in some examples, as the user enters individual characters of the intended word.

Figure 3:
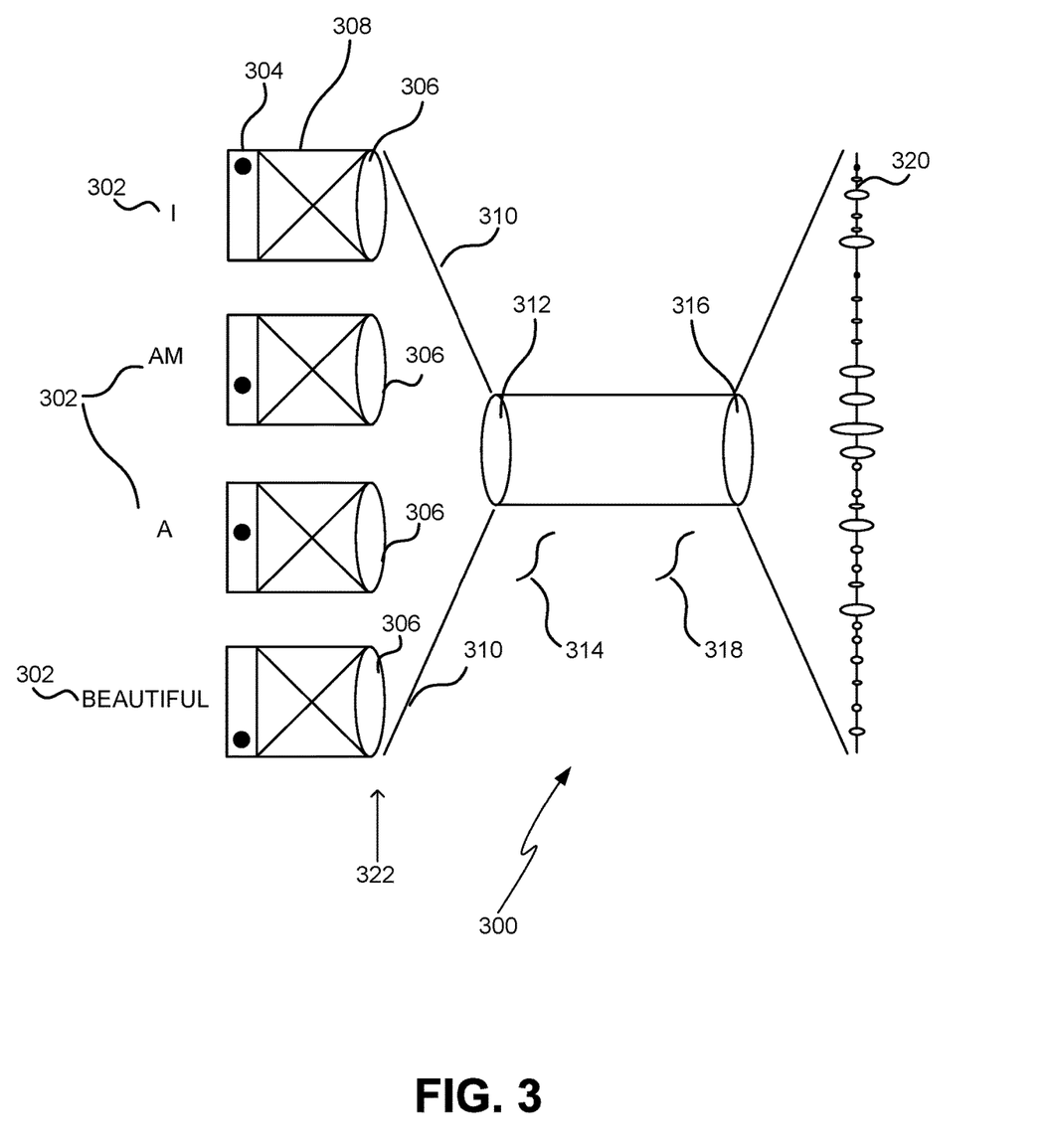
FIG. 3 is a schematic diagram of a neural network such as for use in the electronic devices of FIGS. 1 and 2.

FIG. 3 is a schematic diagram of a neural network 300 such as the neural network 110, 116 of FIG. 1.

A neural network is a collection of nodes (also referred to as units) interconnected by edges and where there are weights associated with the nodes and/or edges. A non-linear function is commonly applied in each node to produce its activation and a non-exhaustive list of non-linear functions which may be used is: sigmoid, tanh, rectifier. During a training phase the weights are updated according to update rules in the light of training examples. The units comprise input units, hidden units and output units. Input units are units at which input is made to the neural network, hidden units are connected between input units and output units (or other hidden units in the case of deep networks), and output units are units at which output from the neural network is observed. A neural network may have a layered construction with a layer of input nodes, one or more layers of hidden units and at least one output layer. During use of the neural network at test time (i.e. after training) as a signal passes through a layer it produces an output via the activations which becomes the input to the next layer of the neural network and so on, until the signal reaches the output layer and the output units are activated. The pattern of activations at the output layer gives the prediction of the neural network. The pattern of activations has been influenced by the weights learnt during the training phase.

The neural network 300 is trained using back propagation or any other neural network training algorithm. A back propagation algorithm comprises inputting a labeled training data instance to the neural network, propagating the training instance through the neural network (referred to as forward propagation) and observing the output. The training data instance is labeled and so the ground truth output of the neural network is known and the difference or error between the observed output and the ground truth output is found and provides information about a loss function. A search is made to try find a minimum of the loss function which is a set of weights of the neural network that enable the output of the neural network to match the ground truth data. Searching the loss function is achieved using gradient descent or stochastic gradient descent or in other ways.

In the example of FIG. 3 the neural network 300 comprises an input layer 322, a single hidden layer 312 and a single output layer 316. However, this is one example only and many other types of architecture may be used with more hidden layers for example, and with recurrent structures where connections between units form a directed cycle.

In the example of FIG. 3 a user has entered the words "I", "am", "a" and "beautiful" and each word is represented by the position of a 1 in a vector otherwise filled with zeros. These vectors are illustrated at 304 in FIG. 3. Each individual word indicator vector 304 is mapped to an item embedding vector 306 by using a mapping 308. For example the item embeddings are looked up from a table or matrix of pre-computed item embeddings or are predicted using a predictive model as explained above. The item embeddings 306 are input to input units of an input layer 322 and create activations which propagate forward through the input layer as indicated by lines 310 to reach hidden layer 312. The hidden layer receives the output of the input layer as its input. The hidden layer processes the signal according to activation functions represented as 314 in FIG. 3 and weights at the hidden layer units. The output of the hidden layer 312 reaches the output layer 316 which also processes the signal according to activation functions represented as 318 in FIG. 3 and generates activations represented as blobs on line 320 at the output units. The activations of the output units are converted to scores of items in a set of available item embeddings. This is done by taking a dot product (or other measure of similarity) between the predicted item embedding given by the activations of the output units and each of the available item embeddings and then, in the case that scalar bias values are available, adding a scalar bias value which has been stored for that item. The scores may be normalized so that they sum to one, for example by applying a softmax function or in other ways. If the available item embeddings are for the words "person", "being", "child", "house", "day" then the result is a score for each of "person", "being" "child" "house" and "day" which indicates how likely the word is to be the next word intended by the user.

Figure 4:
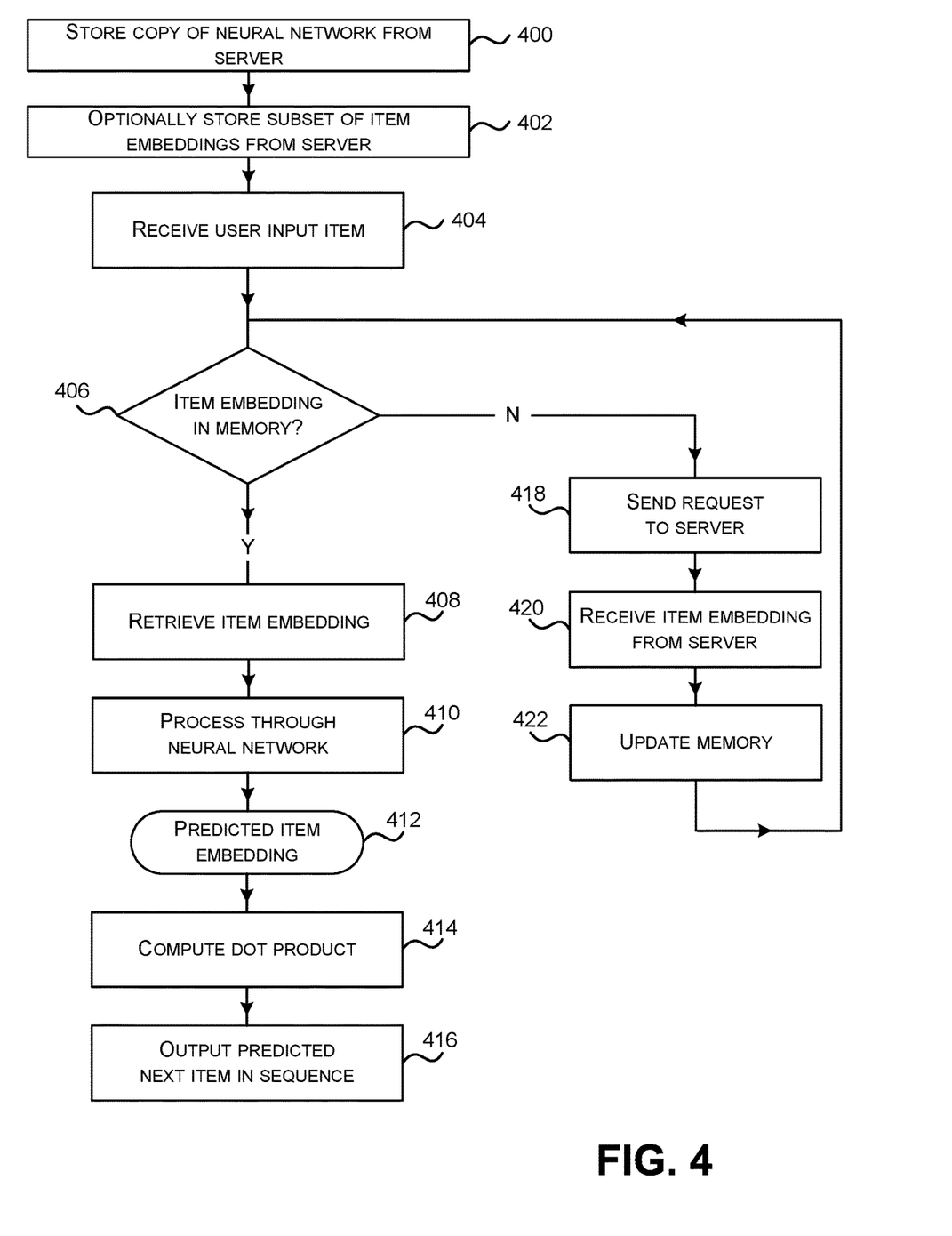
FIG. 4 is a flow diagram of a method of operation at an electronic device such as the electronic devices of FIGS. 1 to 2.

FIG. 4 is a flow diagram of a method of operation at an electronic device such as electronic device 102, 104, 106 of FIG. 1. The electronic device stores 400 a copy of a neural network which is available at a server. The electronic device optionally stores 402 a subset of item embeddings of the neural network which is available at the server. For example, the subset of item embeddings is a default subset of item embeddings comprising item embeddings for the top n most frequently used items as observed over a population of users.

The electronic device receives 404, at an input interface, an item input by the user as part of a sequence of items. For example, the input interface comprises a touch screen and graphical user interface at the electronic device. The electronic device receives a word typed into a predictive keyboard at the electronic device, or a phrase, emoji, character or other item typed into a predictive keyboard at the electronic device. In another example, the input interface comprises a microphone, an analog to digital signal converter, and a speech recognition component whereby the user is able to speak words or phrases to input to the electronic device. The input interface is any mechanism which enables a user to input data to the electronic device.

In some examples, the electronic device predicts that it will receive a user input item rather than actually receiving that user input item at process 404. This prediction is achieved in a variety of ways as described in more detail below.

The electronic device checks 406 whether the received item is present in its memory. If so the electronic device retrieves 408 the item embedding corresponding to the received item from its memory and processes 410 that item embedding through the copy of the neural network at the electronic device. The item embedding is input to the input units of the neural network which generates a signal that propagates through the neural network as described above with reference to FIG. 3, to produce activations at the output units. The activations at the output units give a predicted item embedding 412. The similarity of the predicted item embedding 412 with each of a plurality of item embeddings available at the electronic device is computed (such as by computing dot products 414 as described above) and this gives scores for the individual items corresponding to the item embeddings. The electronic device is then able to output one or more predicted next items in the sequence 416 using the scores, such as by selecting the three highest scoring predicted items. The item embeddings available at the electronic device may be a default subset of the item embeddings from the server as explained above. In cases where the electronic device begins with no item embeddings available then a plurality of item embeddings are requested from the server or are built up over time through the process described with reference to operations 418 to 422.

In the case that there is no item embedding corresponding to the received item in memory of the electronic device, the electronic device triggers transfer of the item embedding from the server to the electronic device. For example, the electronic device sends 418 a request to the server. The request is a request for the item embedding of the item and the request may be a message comprising an address of the electronic device and an identifier of the item for which the item embedding is wanted. In some cases the request is sent 418 on demand, that is, at the time the item embedding is wanted at operation 408. In some cases the electronic device waits to accumulate a plurality of requests and sends those together as a batch. In some cases the request is sent in anticipation of process 408 by predicting what item embeddings the electronic device will need in the future. The electronic device receives 420 the item embedding (or batch of item embeddings) from the server and updates 422 its memory to include the item embedding(s). The process then returns to check point 406.

The prediction process at operation 404 makes use of item use data available to the electronic device where appropriate consent has been given by the user. For example, past SMS or email messages stored at the device or obtained from the server may be used to find item use data where the items are words, phrases, emoji or other text items. In some examples, the item use data is obtained from a language model such as a dynamic n-gram language model or other form of language model at the electronic device. For example, the predictive keyboard may comprise n-gram language model technology for predicting candidate items in addition to the neural network technology. The n-gram language model is dynamic where it updates counts of words or other text items as these are observed at the electronic device. By reading values of suitable counters in the dynamic n-gram language model a manager component 120 of the electronic device obtains item use data in a simple, accurate and efficient manner. The manager component uses the item use data to predict item embeddings at operation 404.

Figure 5:
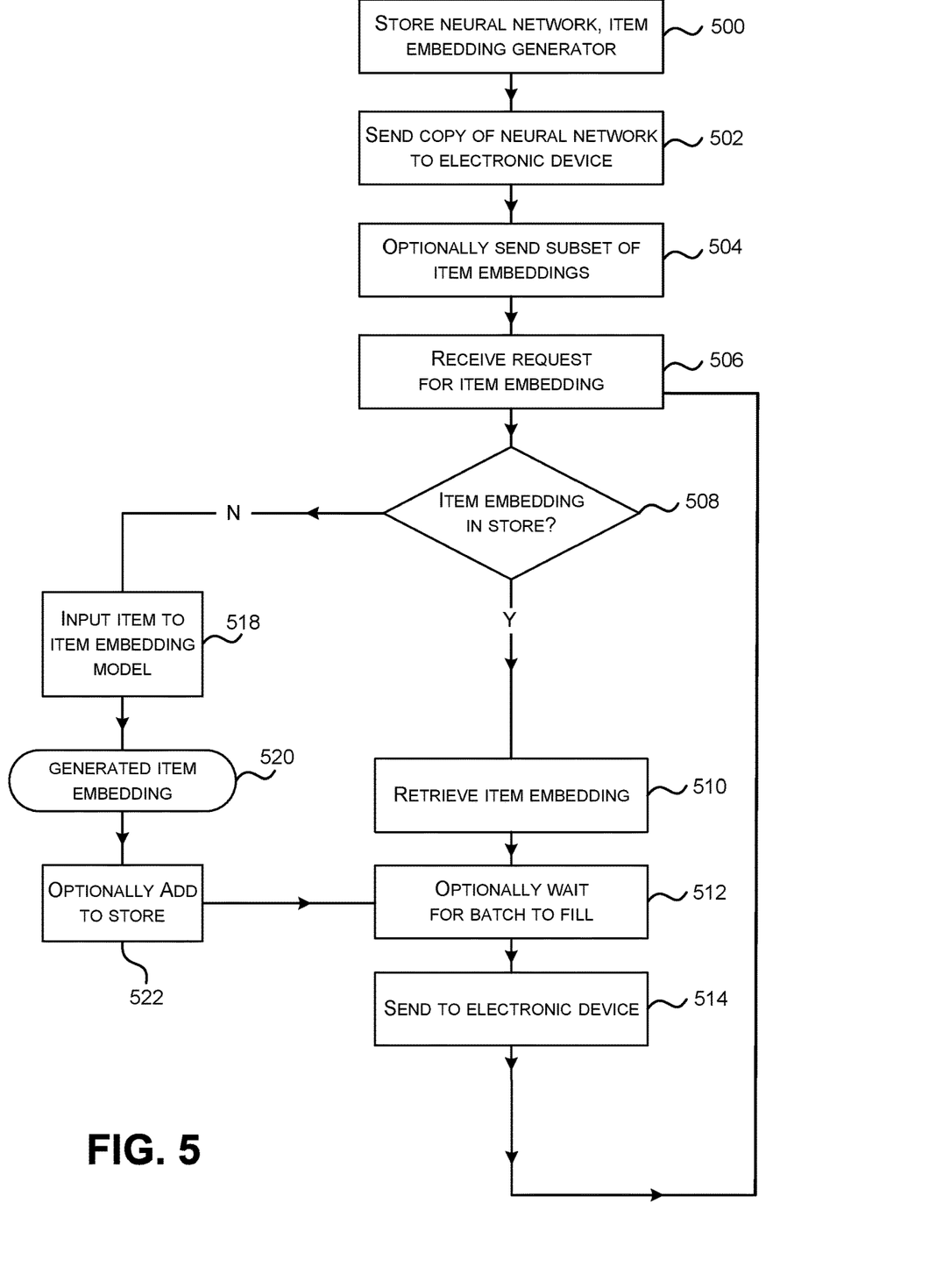
FIG. 5 is a flow diagram of a method of operation at a server such as the server of FIG. 1.

FIG. 5 is a flow diagram of a method of operation at a server such as server 108 of FIG. 1. The server stores 500 a neural network such as that described with reference to FIG. 3 or any other neural network which has been trained to predict candidate next items of a sequence of items. The server stores an item embedding generation process. In some examples the item embedding generation process comprises a look up into a table, matrix or other store of item embeddings. In some examples the item embedding generation process comprises a predictive model trained to predict item embeddings from individual components of an item such as letters of individual words, words of individual phrases, or other individual components. The predictive model may be a neural network itself or any other type of predictive model. An example of a letter based embedding predictor is now described.

An example letter based embedding predictor takes as input an item and computes a predicted item embedding. The letter based embedding predictor may be referred to as a character-compositional word embedding model which is a model that takes into account one or more characters of each word. The predictive model is parameterised and is trained in advance using labelled training data.

In an example the character-compositional word embedding model is convolutional. For example, character embedding vectors are retrieved for each character of each word from a lookup table which forms part of the model's parameters. For example, the character embedding vectors are learned via backpropagation during training of the model in the same way as the model's other parameters. The retrieved character embedding vectors for a given word are fed into a set of one-dimensional convolution filters. The maximum output of each one-dimensional convolution over the length of the word is then obtained. These maximum outputs are fed through additional dense feedforward layers (such as a highway layer) of the neural network to yield a word embedding for the word in question. This is one example of an architecture based on convolutions and others are possible.

In other examples the character-compositional word embedding model is a character recurrent neural network which has either unidirectionality or is bidirectional. In some examples the recurrent neural network uses gated recurrent units (GRUs) or long short term memory (LSTM) cells. In some examples the character-compositional word embedding model is a combination (such as a concatenation, sum or other hybrid) of a neural network which represents each word in terms of its characters, and an additional per-word correction term, comprising a learned vector representation for each of the words in a defined vocabulary, and a learned out-of-vocabulary representation for other words.

The server sends 502 a copy of the neural network to one or more electronic devices. In some cases the electronic devices download the neural network from the server. In some cases the neural network is installed at the electronic device during manufacture.

The server optionally sends 504 a subset of the item embeddings to individual ones of the electronic devices. In some cases the electronic devices download the subset of the item embeddings. In some cases the subset of item embeddings is installed at the electronic device during manufacture. The subset may be the top n most frequently used item embeddings as observed over a population of users. The subset of item embeddings has fewer item embeddings than are available at the server.

In some examples data sent from the server to the client is compressed at the server before being sent, for example, using lossless compression protocols. In some examples, the server quantizes the embeddings and/or neural network weights using a lossy compression scheme before sending those to the client. For instance, rather than sending a 4 byte floating point value per embedding or network weight, the server quantizes to a 1 byte integer value per embedding or weight.

The server receives 506 a request for an item embedding, for example, from one of the electronic devices or from an item use predictor 116 or manager component 120. The server checks 508 if the requested item embedding is available in a store at the server and if not, it inputs 518 the item to an item embedding model (such as a character-compositional word embedding model) as described above. The item embedding model produces a predicted item embedding 520 which is added to the store 522 of item embeddings at the server. The server then sends 514 the predicted item embedding to the electronic device either individually or as part of a batch. In the case of a batch there is an operation 512 to wait for a batch to fill before being sent.

In the case that the server does find the item embedding in its store at step 508, the server retrieves 510 the item embedding from the store, optionally waits for a batch to fill and sends 514 the item embedding to the electronic device. After sending 514 the process returns to operation 506.

Figure 6:
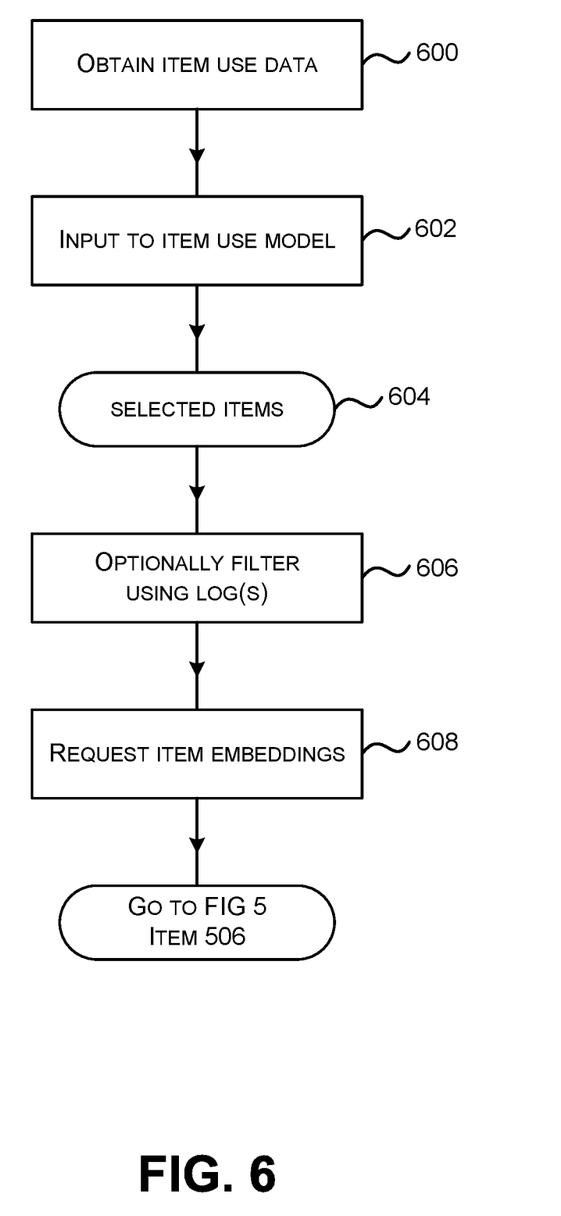
FIG. 6 is a flow diagram of another method of operation at a server such as the server of FIG. 1.

With reference to FIG. 6, the item use predictor 116 at the server (or the manager component 120 at the electronic device) obtains item use data, for example, from social media data, from email messages, from SMS messages, from documents authored by users, or other sources. In some cases at least part of the item use data is obtained from a dynamic n-gram language model at the electronic device or at the server and is supplemented with additional item use data.

In some examples, where user consent has been obtained, the electronic device delivers item use data to the server by sending that data in batches as it is observed at the electronic device, and/or at the point when the electronic device first begins interaction with the server. Where user consent has been obtained, item use data comprises one or more of: text of emails sent and/or received by the electronic device, text of search queries input at the electronic device, text of documents authored at the electronic device, text rendered or presented to the user in other ways by the electronic device, or other text associated with the electronic device.

The item use data is made available 602 to an item use model which is one or more rules, criteria or thresholds for selecting items which are unlikely to be present at individual ones of the electronic devices. For example, the item use model comprises rules to select frequently observed items which are not in a top n most frequently used items of a population of users. The item use model is a trained predictor in some examples such as a trained neural network or other type of predictor.

The selected items 604 are optionally filtered 606 using a log of item embeddings which have recently been sent to an electronic device by the server or where the server has created an updated item embedding which has been sent to the electronic device. Item embeddings are then requested for the selected items and the process moves to operation 506 of FIG. 5.

FIG. 7 illustrates various components of an exemplary computing-based device 700 which are implemented as any form of electronic device in which embodiments of the methods of FIG. 4 are implemented in some examples.

Computing-based device 700 comprises one or more processors 702 which are microprocessors, controllers or any other suitable type of processors for processing computer executable instructions to control the operation of the device in order to predict candidate items in a sequence of items to facilitate entry of the items into the electronic device 700. In some examples, for example where a system on a chip architecture is used, the processors 702 include one or more fixed function blocks (also referred to as accelerators) which implement a part of the method of FIG. 4 in hardware (rather than software or firmware). Platform software comprising an operating system 704 or any other suitable platform software is provided at the computing-based device 700 to enable application software 706 to be executed on the device. A neural network 720 is stored at the electronic device and is a copy of a neural network available at a server. A manager component 726 controls triggering of transfer of item embeddings from the server to the electronic device. An input interface 722 receives items in a sequence of items to enable a user to input the item to the electronic device 700. An item embeddings subset 724 comprises a plurality of item embeddings of the neural network where the number of item embeddings is less than a number of item embeddings available at the server. Completion/correction predictor 718 uses output from the neural network 720 to complete words, phrases, emoji or other items. For example, the completion/correction predictor 718 is a predictive keyboard or a predictive speech recognition system.

The computer executable instructions are provided using any computer-readable media that is accessible by computing based device 700. Computer-readable media includes, for example, computer storage media such as memory 708 and communications media. Computer storage media, such as memory 708, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 708) is shown within the computing-based device 700 it will be appreciated that the storage is, in some examples, distributed or located remotely and accessed via a network or other communication link (e.g. using communication interface 710).

The computing-based device 700 also comprises an input/output controller 712 arranged to output display information to a display device 714 which may be separate from or integral to the computing-based device 700. The display information may provide a graphical user interface. The input/output controller 712 is also arranged to receive and process input from one or more devices, such as a user input device 716 (e.g. a mouse, keyboard, camera, microphone or other sensor). In some examples the user input device 716 detects voice input, user gestures or other user actions and provides a natural user interface (NUI). This user input may be used to input data to the electronic device. In an embodiment the display device 714 also acts as the user input device 716 if it is a touch sensitive display device. The input/output controller 712 outputs data to devices other than the display device in some examples, e.g. a locally connected printing device.

Any of the input/output controller 712, display device 714 and the user input device 716 may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

FIG. 8 illustrates various components of an exemplary computing-based device 800 which are implemented as any form of server in which embodiments of the methods of FIGS. 5 and 6 are implemented in some examples.

Computing-based device 800 comprises one or more processors 802 which are microprocessors, controllers or any other suitable type of processors for processing computer executable instructions to control the operation of the server in order to send item embeddings to an electronic device which has limited resources, to facilitate entry of the items into the electronic device. In some examples, for example where a system on a chip architecture is used, the processors 802 include one or more fixed function blocks (also referred to as accelerators) which implement a part of the method of FIGS. 5 and 6 in hardware (rather than software or firmware). Platform software comprising an operating system 804 or any other suitable platform software is provided at the computing-based device 800 to enable application software 806 to be executed on the device. A neural network 820 is stored at the server. An item embedding model 826 is present in some cases and enables item embeddings to be generated. In some cases the item embedding model is a character-compositional word embedding model. An item use prediction component 822 identifies items that individual ones of the electronic devices are likely to need in future. An item embeddings store 824 holds item embeddings which are available at the server. Completion/correction predictor 818 uses output from the neural network 820 to complete words, phrases, emoji or other items in a sequence of items. For example, the completion/correction predictor 818 is a predictive keyboard or a predictive speech recognition system.

The computer executable instructions are provided using any computer-readable media that is accessible by computing based device 800. Computer-readable media includes, for example, computer storage media such as memory 808 and communications media. Computer storage media, such as memory 808, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 808) is shown within the computing-based device 800 it will be appreciated that the storage is, in some examples, distributed or located remotely and accessed via a network or other communication link (e.g. using communication interface 810).

The computing-based device 800 also comprises an input/output controller 812 arranged to output display information to a display device 814 which may be separate from or integral to the computing-based device 800. The display information may provide a graphical user interface. The input/output controller 812 is also arranged to receive and process input from one or more devices, such as a user input device 816 (e.g. a mouse, keyboard, camera, microphone or other sensor). In some examples the user input device 816 detects voice input, user gestures or other user actions and provides a natural user interface (NUI). This user input may be used to input data to the electronic device. In an embodiment the display device 814 also acts as the user input device 816 if it is a touch sensitive display device. The input/output controller 812 outputs data to devices other than the display device in some examples, e.g. a locally connected printing device.

Any of the input/output controller 812, display device 814 and the user input device 816 may comprise NUI technology as described with reference to FIG. 7.

Alternatively or in addition to the other examples described herein, examples include any combination of the following:

An electronic device comprising:

at least one input interface to receive at least one item of a sequence of items;

a communications interface to communicate with a server over a communications network, the server storing a neural network and a process which generates item embeddings of the neural network;

a memory storing a copy of at least part of the neural network and a plurality of item embeddings of the neural network;

a manager component which, in the case when there is unavailability at the electronic device of a corresponding item embedding corresponding to the received at least one item, triggers transfer of at least the corresponding item embedding from the server to the electronic device; and a processor to predict at least one candidate next item in the sequence by processing the corresponding item embedding, and item embeddings for one or more other preceding items if available, with the copy of at least part of the neural network and using item embeddings for a plurality of candidate next items retrieved from the memory.

The electronic device described above wherein the plurality of item embeddings stored at the electronic device is fewer than a number of item embeddings stored at the server.

The electronic device described above wherein an item embedding is a plurality of learnt weights representing an item of the sequence of items in a form that can be processed by units of a neural network.

The electronic device described above wherein the processor is configured to retrieve an output vector at an output layer of the neural network by transforming input to the output layer, with an encoding matrix formed from the plurality of item embeddings stored in the memory, wherein the output vector corresponds to the at least one candidate next item.

The electronic device described above wherein the manager component is configured to trigger transfer of the corresponding item embedding from the server by sending a request to the server, the request comprising the received at least one item or an identifier of the received at least one item.

The electronic device described above wherein the manager component is configured to control the number of item embeddings of the neural network stored in the memory by replacing or deleting individual ones of the item embeddings such that a maximum number of item embeddings stays below a threshold value.

The electronic device described above wherein the manager component is configured to control the number of item embeddings of the neural network stored in the memory by using a least recently used cache.

The electronic device described above wherein the manager component is configured to access data about historical sequences of items and is configured to trigger transfer of item embeddings to the electronic device from the server based at least on the data.

The electronic device of described above wherein the manager component is configured to use smoothed frequency of item use data to trigger transfer of embeddings to the electronic device from the server.

The electronic device described above wherein the manager component is configured to ensure that a specified plurality of item embeddings are retained in the memory at the electronic device.

The electronic device described above wherein the manager component is configured to access the data about historical sequences of items from a dynamic n-gram language model at the electronic device.

The electronic device described above wherein the processor is configured to display the candidate next item for input to the electronic device.

A server comprising:

a neural network configured to predict at least one candidate next item in a sequence of items using item embeddings of the neural network;

a processor configured to generate item embeddings of the neural network; and a communications interface to communicate with an electronic device over a communications network, the electronic device having a copy of at least part of the neural network;

the processor configured to send one or more of the item embeddings to the electronic device using the communications interface, at least when triggered by the electronic device.

The server described above wherein the processor is configured to generate the item embeddings of the neural network by looking up the item embeddings in a store of item embeddings stored at the server.

The server described above wherein the processor is configured to generate an item embedding corresponding to an item of a sequence of items received over the communications interface from the electronic device, and to send the generated item embedding to the electronic device.

The server described above wherein the processor is configured to send one or more of the item embeddings to the electronic device according to predictions of item embeddings that the electronic device is predicted to need.

The server described above comprising an item use prediction component configured to predict items for which item embeddings will be needed at the electronic device, using item use data.

The server described above wherein a plurality of item embeddings is stored at the server and wherein a number of item embeddings stored at the server is greater than a threshold number of item embeddings permitted at the electronic device.

The server described above wherein an item embedding is a plurality of learnt weights representing an item of the sequence of items as a real-valued vector.

A method at an electronic device comprising:

receiving, at an input interface, at least one item of a sequence of items;

communicating with a server over a communications network, the server storing a neural network and a process which generates item embeddings of the neural network;

storing a copy of at least part of the neural network and a plurality of item embeddings of the neural network;

in the case when there is unavailability at the electronic device of a corresponding item embedding corresponding to the received at least one item, triggering transfer of the corresponding item embedding from the server to the electronic device;

predicting at least one candidate next item in the sequence by processing the corresponding item embedding, and item embeddings for one or more other preceding items if available, with the copy of at least part of the neural network and using item embeddings for a plurality of candidate next items retrieved from the memory; and providing the candidate next item for input to the electronic device.

A method at a server comprising:

storing a neural network configured to predict at least one candidate next item in a sequence of items using item embeddings of the neural network;

generating item embeddings of the neural network;

communicating with an electronic device over a communications network, the electronic device having a copy of the neural network;

sending one or more of the item embeddings to the electronic device using the communications interface, at least when triggered by the electronic device.

A method at an electronic device comprising:

means for receiving, at least one item of a sequence of items;

means for communicating with a server over a communications network, the server storing a neural network and a process which generates item embeddings of the neural network;

means for storing a copy of at least part of the neural network and a plurality of item embeddings of the neural network;

means for, in the case when there is unavailability at the electronic device of a corresponding item embedding corresponding to the received at least one item, triggering transfer of the corresponding item embedding from the server to the electronic device; and means for predicting at least one candidate next item in the sequence by processing the corresponding item embedding, and item embeddings for one or more other preceding items if available, with the copy of at least part of the neural network and using item embeddings for a plurality of candidate next items retrieved from the memory.

The examples illustrated and described herein as well as examples not specifically described herein but within the scope of aspects of the disclosure constitute exemplary means for communicating with a server over a communications network, the server storing a neural network and a process which generates item embeddings of the neural network. For example, the means for communicating with a server comprises communications interface 710, 810 such as a network card, a transceiver or any other communications interface. For example, the means for storing a copy of the neural network and a plurality of item embeddings of the neural network comprises a memory such as any of the types of memory described with reference to FIGS. 7 and 8. For example, the means for, in the case when there is unavailability at the electronic device of a corresponding item embedding corresponding to the received at least one item, triggering transfer of the corresponding item embedding from the server to the electronic device, comprises a processor or a memory manager at the electronic device. For example, the means for predicting at least one candidate next item in the sequence by processing the corresponding item embedding with the copy of the neural network and the plurality of item embeddings stored in the memory, comprises a processor at the electronic device. For example, a means for displaying the candidate next item for input to the electronic device comprises the processor at the electronic device.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. An electronic device comprising:
    at least one processor;
    a communications interface to communicate with a server over a communications network, the server storing a neural network and a process which generates item embeddings of the neural network; and
    a memory communicatively coupled to the at least one processor, the memory storing thereon:
    a local copy of a part of the neural network and a plurality of item embeddings of the neural network; and
    computer-readable instructions that, when executed by the at least one processor, cause the electronic device to perform operations comprising:
    receiving, from at least one input interface, data indicative of at least one item of a sequence of items;
    initiating transfer of an item embedding corresponding to the received at least one item from the server storing the neural network when the corresponding item embedding is not available at the electronic device;
    accessing item embeddings for a plurality of candidate next items and item embeddings for one or more other preceding items when available; and
    outputting from the local copy of the part of the neural network, a prediction of at least one candidate next item in the sequence of items based on said accessing and the corresponding item embedding.

2. The electronic device of claim 1 wherein the plurality of item embeddings stored at the electronic device is fewer than a number of item embeddings stored at the server.

3. The electronic device of claim 1 wherein an item embedding is a plurality of learned weights representing an item of the sequence of items in a form that can be processed by units of a neural network.

4. The electronic device of claim 1 further comprising computer-readable instructions that, when executed by the at least one processor, cause the electronic device to perform operations comprising retrieving an output vector at an output layer of the neural network by transforming input to the output layer, with an encoding matrix formed from the plurality of item embeddings stored in the memory, wherein the output vector corresponds to the at least one candidate next item.

5. The electronic device of claim 1 when further comprising computer-readable instructions that, when executed by the at least one processor, cause the electronic device to perform operations comprising triggering transfer of the corresponding item embedding from the server by sending a request to the server, the request comprising the received at least one item or an identifier of the received at least one item.

6. The electronic device of claim 1 further comprising computer-readable instructions that, when executed by the at least one processor, cause the electronic device to perform operations comprising controlling a number of item embeddings of the at least part of the neural network by replacing or deleting individual ones of the item embeddings such that a maximum number of item embeddings remains below a threshold value.

7. The electronic device of claim 1 further comprising computer-readable instructions that, when executed by the at least one processor, cause the electronic device to perform operations comprising controlling a number of item embeddings of the at least part of the neural network by using a least recently used cache.

8. The electronic device of claim 1 further comprising computer-readable instructions that, when executed by the at least one processor, cause the electronic device to perform operations comprising accessing data about historical sequences of items and triggering transfer of item embeddings to the electronic device from the server based at least on the data.

9. The electronic device of claim 1 further comprising computer-readable instructions that, when executed by the at least one processor, cause the electronic device to perform operations comprising using smoothed frequency of item use data to trigger transfer of embeddings to the electronic device from the server.

10. The electronic device of claim 1 further comprising computer-readable instructions that, when executed by the at least one processor, cause the electronic device to perform operations comprising ensuring that a specified plurality of item embeddings are retained in the memory at the electronic device.

11. The electronic device of claim 1 further comprising computer-readable instructions that, when executed by the at least one processor, cause the electronic device to perform operations comprising accessing data about historical sequences of items from a dynamic n-gram language model at the electronic device.

12. The electronic device of claim 1 further comprising computer-readable instructions that, when executed by the at least one processor, cause the electronic device to perform operations comprising displaying the candidate next item for input to the electronic device.

13. A server comprising:
a storage medium having a neural network stored thereon, the neural network configured to predict at least one candidate next item in a sequence of items using item embeddings of the neural network;
a processor; and
a memory communicatively coupled to processor, the memory storing thereon computer-readable instructions that, when executed by the processor, cause the server to perform operations comprising:
receiving a request from an electronic device for an item embedding when the item embedding is not available at the electronic device;
generating item embeddings, including the item embedding, of the neural network; and
sending a subset of the item embeddings including the item embedding to the electronic device when triggered by the electronic device storing thereon a local copy of a part of the neural network, the subset of the item embeddings configured to be used with the local copy of the part of the neural network stored on the electronic device to output a prediction of at least one candidate next item in a sequence of items received at the electronic device.

14. The server of claim 13 further comprising computer-readable instructions that, when executed by the processor, cause the server to perform operations comprising generating the item embeddings of the neural network by looking up the item embeddings in a store of item embeddings stored at the server.

15. The server of claim 13 further comprising computer-readable instructions that, when executed by the processor, cause the server to perform operations comprising:
generating an item embedding corresponding to an item of a sequence of items received from the electronic device, and
sending the generated item embedding to the electronic device.

16. The server of claim 13 further comprising computer-readable instructions that, when executed by the processor, cause the server to perform operations comprising sending one or more of the item embeddings to the electronic device according to predictions of item embeddings that the electronic device is predicted to need.

17. The server of claim 13 further comprising computer-readable instructions that, when executed by the processor, cause the server to perform operations comprising predicting items for which item embeddings will be needed at the electronic device, using item use data.

18. The server of claim 13 wherein a plurality of item embeddings is stored at the server and wherein a number of item embeddings stored at the server is greater than a threshold number of item embeddings permitted at the electronic device.

19. The server of claim 13 wherein an item embedding is a plurality of learned weights representing an item of the sequence of items as a real-valued vector.

20. A method comprising:
receiving, at an input interface of a computing device, at least one item of a sequence of items;
communicating, by the computing device over a communications network, with a server storing a neural network and configured to implement a process which generates item embeddings of the neural network;
storing, at the computing device, a local copy of a part of the neural network and a plurality of item embeddings of the neural network;
triggering, by the computing device, transfer of a corresponding item embedding from the server to the computing device when there is unavailability at the computing device of the corresponding item embedding corresponding to the received at least one item;
outputting, by the computing device from the local copy of the part of the neural network, a prediction of at least one candidate next item in the sequence by processing the corresponding item embedding and item embeddings for one or more other preceding items and using item embeddings for a plurality of candidate next items retrieved from memory; and
inputting the candidate next item to the computing device.

* * * * *